(12) United States Patent
Villefrance et al.

(10) Patent No.: US 7,451,178 B2
(45) Date of Patent: Nov. 11, 2008

(54) DATA TRANSFER

(75) Inventors: Rasmus Villefrance, Helsinge (DK); Simon Islip, Hampshire (GB); Jamie B. McHardy, Douglas (IM); Brian Tracy, Hampshire (GB)

(73) Assignee: Nokia Corporation, Espoo (FI)

( * ) Notice: Subject to any disclaimer, the term of this patent is extended or adjusted under 35 U.S.C. 154(b) by 867 days.

(21) Appl. No.: 10/825,514

(22) Filed: Apr. 15, 2004

(65) Prior Publication Data

US 2006/0080381 A1 Apr. 13, 2006

(51) Int. Cl.
*G06F 15/16* (2006.01)

(52) U.S. Cl. ............... 709/203; 709/212; 709/216; 709/219; 709/245; 709/248; 707/3; 707/10

(58) Field of Classification Search ........... 709/203, 709/212, 216, 219, 245, 248; 707/3, 10
See application file for complete search history.

(56) References Cited

U.S. PATENT DOCUMENTS

| | | | |
|---|---|---|---|
| 6,542,964 B1 * | 4/2003 | Scharber | 711/122 |
| 6,778,834 B2 * | 8/2004 | Laitinen et al. | 455/450 |
| 6,895,444 B1 * | 5/2005 | Weisshaar et al. | 709/250 |
| 7,203,505 B1 * | 4/2007 | Larikka et al. | 455/466 |
| 7,222,160 B2 * | 5/2007 | Hlasny | 709/217 |
| 2002/0184208 A1 * | 12/2002 | Kato | 707/4 |
| 2004/0024846 A1 * | 2/2004 | Randall et al. | 709/219 |
| 2005/0021867 A1 * | 1/2005 | Partanen et al. | 709/248 |

OTHER PUBLICATIONS

Suvak et al., "Specifications for Ir Mobile Communications (IrMC)", Infrared Data Association, Mar. 1, 1999, pp. 1-36.

* cited by examiner

*Primary Examiner*—Michael Won
(74) *Attorney, Agent, or Firm*—Perman & Green, LLP

(57) ABSTRACT

A client device for obtaining a data object from a server device, comprising: a transmitter for sending to the server device a request comprising a first codeword and an arbitrary alphanumeric string, wherein the first codeword indicates that the alphanumeric string should be interpreted at the server as a search string; and a receiver for receiving from the server device, in reply to the request, a data object comprising the arbitrary alphanumeric string. A server device for providing a data object to a client device, comprising: a receiver for receiving from the client device a request comprising a first codeword and an arbitrary alphanumeric string; parsing means for parsing the request; detection means for detecting the presence of the first codeword in the request; search means for searching a database comprising data objects to obtain a data object comprising the alphanumeric search string; and a transmitter for transmitting to the client device, in reply to the request, the obtained data object.

19 Claims, 1 Drawing Sheet

DATA TRANSFER

FIELD OF THE INVENTION

Embodiments of the invention relate to using a client device to obtain a desired data object from a server device. In particular, embodiments relate to using an OBEX client device to obtain a desired data object from an OBEX server device.

BACKGROUND TO THE INVENTION

OBEX (object exchange) is a compact binary protocol that enables data exchange. It was originally developed by the Infrared Device Association (IrDA) for infrared communication but it can be used with other transport mechanisms. OBEX performs a function similar to HTTP but is less resource intensive.

An OBEX client is a device that initiates a connection to an OBEX server. An OBEX server is a device that listens for incoming connections from a client. Data is exchanged by pushing data from the client to the server or by pulling data from the server to the client. Pushing is accomplished with a Put command and pulling is accomplished with a Get command.

OBEX is optimized for ad-hoc wireless links but can be used to exchange all kind of data objects like files, pictures, calendar entries (vCalendar) and business cards (vCard). vCal is an Internet Mail Consortium (IMC) standard that defines a transport- and platform-independent format for exchanging calendar and schedule information. vCard is an IMC standard defining the format of an electronic business card. All devices supporting vCard can exchange information such as phone numbers and addresses.

At present OBEX allows a particular vCard to be pulled by a client from a server by using a GET command that specifies the identity of the VCARD. For example, the first entry in a mobile phone phonebook may be obtained by sending the command OBEX_GET (NAME='/file/telecom/pb/0.vcf') and the n+1 th phonebook entry can be obtained by sending the command OBEX_GET (NAME='/file/telecom/pb/n.vcf'). The NAME header specifies the location of the file that is being pulled.

However, a problem arises if the client does not know the number of the desired phone book entry. If the number is not known, the NAME header cannot be correctly composed and the desired entry cannot be retrieved. It may be possible to pull all the phonebook entries, however, this may take a considerable time.

It would therefore be desirable to allow an OBEX client to retrieve a desired data object from a server without specifying the filename of the object.

It would in particular be desirable to allow an OBEX client to retrieve a desired data object from an OBEX server by specifying an alphanumeric string contained within the object.

BRIEF DESCRIPTION OF THE INVENTION

According to one embodiment of the invention there is provided a client device for obtaining a data object from a server device, comprising: a transmitter for sending to the server device a request comprising a first codeword and an arbitrary alphanumeric string, wherein the first codeword indicates that the alphanumeric string should be interpreted at the server as a search string; and a receiver for receiving from the server device, in reply to the request, a data object comprising the arbitrary alphanumeric string.

According to another embodiment of the invention there is provided a method of obtaining a data object from a server device, comprising: composing a request comprising a predetermined first codeword and an arbitrary alphanumeric string, wherein the first codeword indicates that the alphanumeric string should be interpreted at the server as a search string; sending the composed request to the server device; and receiving from the server device, in reply to the request, a data object comprising the arbitrary alphanumeric string.

According to another embodiment of the invention there is provided a server device for providing a data object to a client device, comprising: a receiver for receiving from the client device a request comprising a first codeword and an arbitrary alphanumeric string; parsing means for parsing the request; detection means for detecting the presence of the first codeword in the request; search means for searching a database comprising data objects to obtain a data object comprising the alphanumeric search string; and a transmitter for transmitting to the client device, in reply to the request, the obtained data object.

According to another embodiment of the invention there is provided a method of providing a data object to a client device, comprising: receiving from the client device a request comprising a first codeword and an arbitrary alphanumeric string; if the first codeword is in a received request, searching a database comprising data objects, using the alphanumeric string as a search string, to obtain a data object comprising the alphanumeric search string; and transmitting from the server device, in reply to the request, the obtained data object.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
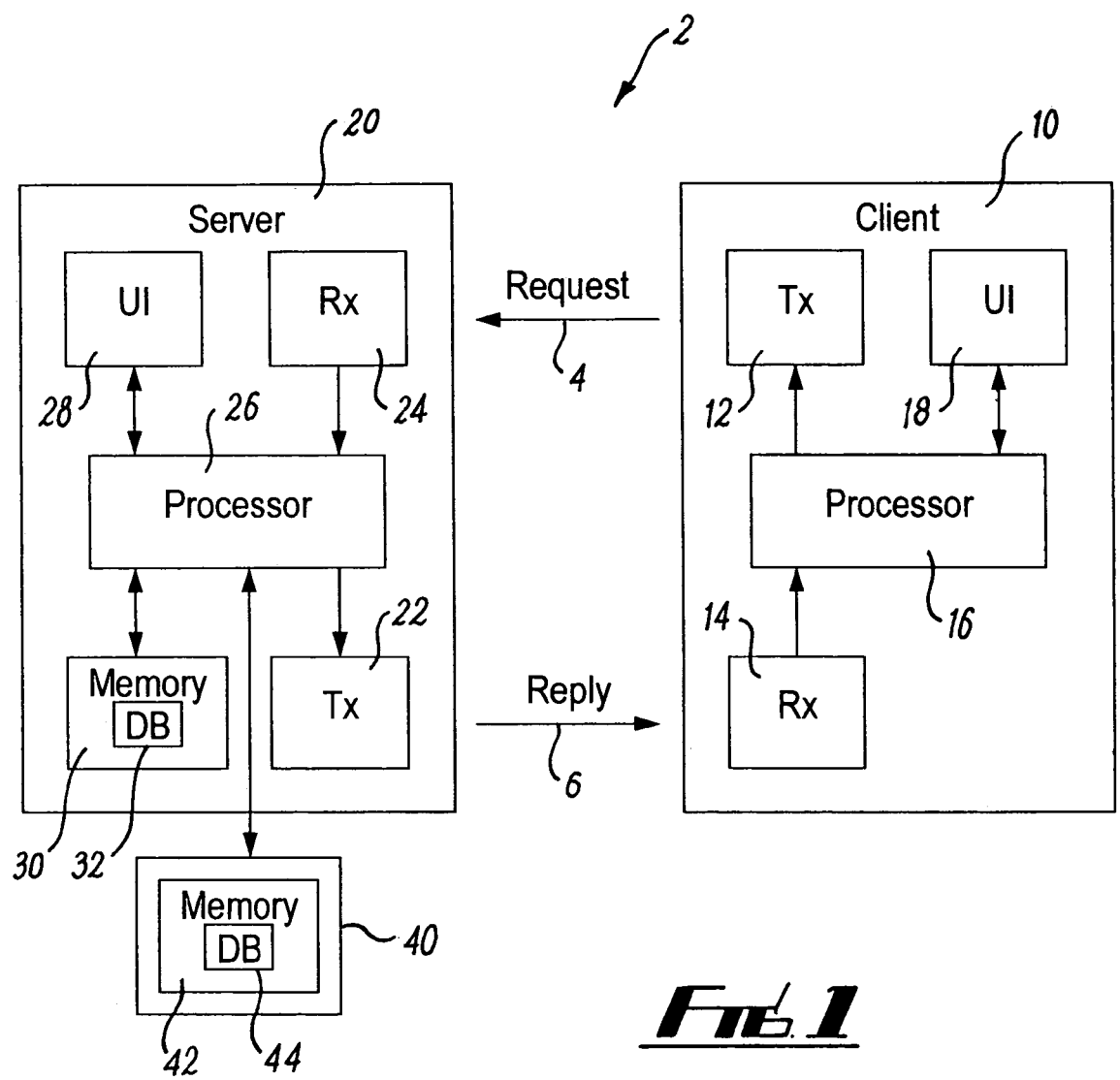
FIG. 1 illustrates a system 2 comprising a client device 10 that obtains a data object from a server device 20.

FIG. 1 illustrates a system 2 comprising a client device 10 that obtains a data object from a server device 20. The client device 10 sends a request message 4 to the server device 20. The request message 4 comprises a first codeword and an arbitrary alphanumeric string. The first codeword indicates that the arbitrary alphanumeric string should be interpreted at the server 20 as a search string. The server device 20, after receiving the request message 4, searches a database 32, 42 comprising data objects to obtain a data object comprising the arbitrary alphanumeric search string and sends, to the client device in reply to the request message, a reply message 6 that includes the obtained data object.

The server device 20 may have access to more than one database and the request message 4 may identify the database to be searched. The databases 44, 32 may be located in one or more memories 42, 30 and the request message 4 may identify a memory location.

The client device 10 and the server device 20 may communicate with each other via a wireless communication channel or via an galvanic connection depending upon how the invention is implemented.

As an the example, the server device 20 may be a mobile cellular telephone and the client device may be an accessory device, such as a headset. The accessory may be physically connected to the telephone via a jack or communication may occur via a wireless link, such as Bluetooth or Infrared.

The client device 10 comprises; a transmitter 12 for sending to the server device 20 the request message 4; a receiver 14 for receiving from the server device 20 the reply message 6; a processor 16 for controlling the operation of the client device 10; and a user interface 18. The processor 16 is connected to receive data from the receiver 14 and the user interface 18 and to provide data to the transmitter 12 and the user interface 18.

The user interface 18 comprises a user input device such as a keypad, joystick or voice recognition circuitry.

The processor 16 composes the request message 4. The request message 4 is an OBEX GET command comprising a NAME header. The NAME header has a particular format that includes a series of codewords.

Typically an OBEX GET command is used to obtain a file stored at an OBEX server. The OBEX GET command specifies the full path of the file name. Such an OBEX GET command could have the form OBEX_GET(NAME='file/telecom/pb/n.vcf'), if the n+1 th entry in the phonebook database is required. The file name is 'n'.

According to embodiments of the invention a new NAME header is used in the OBEX GET command. One example of the new command is OBEX_GET(NAME='file/telecom/pb/search/$.vcf'). This NAME header includes an arbitrary alphanumeric string ($) that follows but is separated from a first codeword (search). The first codeword (search) indicates that the alphanumeric string ($) should be interpreted at the OBEX server 20 as a search string and not as a filename.

Although the new search command has some similarities with the typical command it is different in two important respects. The new search command has an additional component (the first component) in the NAME header which indicates that the command is a search command. In addition, the NAME header has an alphanumeric string instead of a file name.

The first codeword is preferably predetermined in the sense that it is known to the server device 20 before the processor 16 of the client device 10 composes the request message 4. It can therefore be automatically added to the NAME header by the processor 16.

The arbitrary alphanumeric string is not of fixed content. The client can specify the content of the arbitrary alphanumeric string or the user can specify the content using the user input device of the user interface 18. Alternatively the arbitrary alphanumeric string may be received or generated at the client device 10, for example, the arbitrary alphanumeric string may be a telephone number of an incoming call identified using call-line-identification (CLI). The alphanumeric string includes a character or a series of characters such as ASCII characters. The alphanumeric string may therefore comprise only a number or only numerals, only a letter or only letters or a mixture comprising letters and numerals. The alphanumeric string may be for example the whole or part of a telephone number, the whole or part of a name, the whole or part of an address, or the whole or part of a search keyword.

The first codeword (search) is preceded by but separated from a second codeword that identifies the database to be searched. If the database to be searched is a phonebook database then the second codeword used is 'pb' as in the example above. If the database to be searched is a calendar or scheduling database then the second codeword used is 'cal'. If the database to be searched is a message database, for example an SMS inbox, then the second codeword used is 'msg'.

A third codeword (file) starts the series of codewords and indicates the memory location of the database to be searched by the server device 20. If the database to be searched is located in the mobile cellular telephone, then the third codeword used is 'file' as in the example above. If the database to be searched is located in a first smart card housed by the mobile cellular telephone, then the third codeword used is 'SIM0'.

The alphanumeric string is followed by an extension (.vcf) that identifies the type of data object that the server device 20 should return. The extension vcf indicates a vcard data object, the extension vcal indicates a vcalendar data object and the extension vmsg indicates a message data object. The extension used is dependent upon the identity of the database to be searched.

The process of composing a request message 4, starts with a decision being made to compose a request message 4. This may follow from the context of the client device 10 or from user selection of a search option using the user interface 18. The alphanumeric string is then specified. It may be specified automatically from the context or by the user inputting via the user interface 18. The second codeword is then specified. This codeword identifies the database to be searched. This codeword may be specified automatically from the context or by user selection using the user interface 18. The third codeword is then specified. The default value may be 'file' indicating that the database is in the telephone, or it may be specified by the user using the user interface 18. The processor is thus able to compose the request message 4 and control the transmitter 12 to send it to the server device 20.

The processor 16 also processes the received reply message 6. It obtains the data object comprising the arbitrary alphanumeric string contained in the reply message 6. The obtained data object may then be stored to memory or displayed to the user via the user interface.

An example of how a request message may be automatically composed as a result of the context of the client device follows. Let us consider as an example, that there is an incoming telephone call and the telephone number of the originator of the incoming call is available at the client device via call line identification (CLI). It is generally desirable to display a persons name instead of their telephone number telephone number. The client device therefore needs to associate a name with the telephone number. This context indicates that a phonebook search is required. The telephone number is automatically used as the arbitrary alphanumeric string, first codeword is automatically set to indicate that the alphanumeric string is a search string and the second codeword is automatically specified as 'pb' indicating that a phonebook search is required. The request message 4 could, for example, be OBEX_GET (NAME='file/telecom/pb/search/telephone_number.vcf'). The server searches its phonebook database and returns to the client device the vcard comprising the requested telephone number. The client device then displays the vcard or a portion of the vcard thereby identifying the originator of the incoming call by name.

The server device 20 comprises: a receiver 24 for receiving the request message 4; a transmitter 22 for sending the reply message 6; a processor 26 for controlling the operation of the server device 20; a user interface 28 and a memory 30 that includes a database 32 of data objects.

The processor 26 is connected to receive data from the receiver 24 and the user interface 28 and to provide data to the transmitter 22 and the user interface 28. The processor 26 is also connected to write to and read from the memory 30 and access the database 32.

Optionally, the server device 20 may access a database that is stored in a memory that is not part of the server device 20. For example, the server device 20 may house a smart card 40 that has a memory 42 containing a database 44. The processor 26 is connected to the smart card and can access the database 44.

Each database stores a plurality of data objects. One database may be a phonebook that associates telephone numbers with names. This association may be achieved by storing a plurality of vcards. Another database may be a calendar that stores a plurality of vcals. Another database may be a message Inbox or the like that stores a plurality of text messages.

Each database has a search interface. If the search interface receives an alphanumeric string the database returns the database entry that contains that alphanumeric string or if there is no such entry a null value.

The search interface is typically provided by a method called by the processor 26 that takes an alphanumeric string as its argument. There is a distinct method for each database.

The alphanumeric string may be provided by a user via the user interface 28, in which case the result returned by the accessed database is displayed locally via the user interface 28. Thus for example, the user may search the phonebook to obtain a telephone number for dialing.

The alphanumeric string may also be received in the request message in which case the result returned by the accessed database is placed in the reply message 6 and sent to the client device 10.

When a request message 4 is received at the server device 20, the processor 28 parses the NAME header of the OBEX GET command contained in the received request message into its constituents e.g. first codeword, second codeword, third codeword, alphanumeric string and extension.

If the predetermined first codeword is not present the processor 26 detects this. This indicates that the received GET command is a request for a specific data object that is specified by file name. The processor 26 can reads this data object from the appropriate memory and pass it to the transmitter for transmission to the client 10.

If the predetermined first codeword is present, the processor 26 detects this. This indicates that the received GET command is a search request and not a file access request. The processor 26 calls the search method for the database specified by the second codeword at the location specified by the third codeword. The alphanumeric string is used as an argument of the search method call. The method accesses the specified database and returns the data object, if any, that includes the alphanumeric string. The processor 26 then composes the response message 6, which includes this data object and sends it via the transmitter 22 to the client device 10.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A client device for obtaining a data object from a server device, comprising:
    a transmitter for sending to the server device a request comprising a first codeword and an arbitrary alphanumeric string, wherein the first codeword indicates that the alphanumeric string should be interpreted at the server as a search string; and
    a receiver for receiving from the server device, in reply to the request, a data object comprising the arbitrary alphanumeric string;
    wherein the request additionally comprises a second codeword indicating a database to be searched by the server and a third codeword indicating a memory location of the database to be searched by the server, wherein the first codeword is 'search', wherein the second codeword is one of 'pb', 'cal', and 'msg', and wherein the third codeword comprises one of 'SIM' or 'file'.

2. A client device as claimed in claim 1, wherein the request comprises a GET command comprising a header that includes the first codeword and the arbitrary alphanumeric string, wherein the first codeword indicates that the alphanumeric string should be interpreted at the server as a search string and not as a filename.

3. A client device as claimed in claim 2, wherein the arbitrary alphanumeric string follows but is separated from the first codeword.

4. A client device as claimed in claim 2, wherein the header additionally comprises a second codeword indicating the database to be searched.

5. A client as claimed in claim 4, wherein the first codeword follows but is separated from the second codeword and the arbitrary alphanumeric string follows but is separated from the first code word.

6. A client device as claimed in claim 5, wherein the header additionally comprises a third codeword indicating the memory location of the database to be searched by the server.

7. A client device as claimed in claim 1, wherein the alphanumeric string is followed by an extension that specifies the type of data object received from the server.

8. A client device as claimed in claim 1, wherein the received data object is a vcard comprising the arbitrary alphanumeric string.

9. A client device as claimed in claim 1, wherein the received data object is a vcalendar comprising the arbitrary alphanumeric string.

10. A client device as claimed in claim 1, comprised in an accessory to the server device.

11. A client device as claimed in claim 1 comprised in an accessory to a mobile cellular telephone.

12. A method of obtaining a data object from a server device, comprising:
    composing a request comprising a predetermined first codeword and an arbitrary alphanumeric string, wherein the first codeword indicates that the alphanumeric string should be interpreted at the server as a search string;
    sending the composed request to the server device; and
    receiving from the server device, in reply to the request, a data object comprising the arbitrary alphanumeric string;
    wherein the request additionally comprises a second codeword indicating a database to be searched by the server and a third codeword indicating a memory location of the database to be searched by the server, wherein the first codeword is 'search', wherein the second codeword is one of 'pb', 'cal' and 'msg', and wherein the third codeword comprises one of 'SIM' or 'file'.

13. A server device for providing a data object to a client device, comprising:
    a receiver for receiving from the client device a request comprising a first codeword and an arbitrary alphanumeric string;
    parsing means for parsing the request;
    detection means for detecting the presence of the first codeword in the request;

search means for searching a database comprising data objects to obtain a data object comprising the alphanumeric search string; and a transmitter for transmitting to the client device, in reply to the request, the obtained data object;

wherein the request additionally comprises a second codeword indicating the database to be searched and wherein the search means is arranged to search the database indicated by the second codeword;

wherein the request additionally comprises a third codeword indicating the memory location of the database to be searched and wherein the search means is arranged to search at a memory location indicated by the third codeword;

wherein the first codeword is 'search', wherein the second codeword is one of 'pb', 'cal' and 'msg', and wherein the third codeword comprises one of 'SIM' or 'file'.

14. A server device as claimed in claim 13, further comprising a user interface for user specification of a search string and for displaying a data object, wherein the search means is arranged to search the database to obtain a data object, comprising the user specified search string, for display in the user interface.

15. A server device as claimed in claim 13, wherein the request comprises a GET command comprising a header that includes the predetermined first codeword and the arbitrary alphanumeric string and the parsing means is arranged to parse the header.

16. A server device as claimed in claim 15, wherein the header additionally comprises a second codeword indicating the database to be searched and wherein the search means is arranged to search the database indicated by the second codeword.

17. A server device as claimed in claim 16, wherein the header additionally comprises a third codeword indicating the memory location of the database to be searched and wherein the search means is arranged to search at a memory location indicated by the third codeword.

18. A server device as claimed in claim 13, incorporated within a mobile cellular telephone.

19. A method of providing a data object to a client device, comprising:

receiving from the client device a request comprising a first codeword and an arbitrary alphanumeric string;

if the first codeword is in a received request, searching a database comprising data objects, using the alphanumeric string as a search string, to obtain a data object comprising the alphanumeric search string; and transmitting from the server device, in reply to the request, the obtained data object;

wherein the request additionally comprises a second codeword indicating a database to be searched by the server and a third codeword indicating a memory location of the database to be searched by the server, wherein the first codeword is 'search',wherein the second codeword is one of 'pb', 'cal' and 'msg', and wherein the third codeword comprises one of 'SIM' or 'file'.

* * * * *